US011144940B2

(12) United States Patent
Flora et al.

(10) Patent No.: US 11,144,940 B2
(45) Date of Patent: Oct. 12, 2021

(54) METHODS AND APPARATUS TO GENERATE HIGHLY-INTERACTIVE PREDICTIVE MODELS BASED ON ENSEMBLE MODELS

(71) Applicants: Benjamin Jack Flora, Dublin, CA (US); Anthony Yu-Yong Chong, Saratoga, CA (US)

(72) Inventors: Benjamin Jack Flora, Dublin, CA (US); Anthony Yu-Yong Chong, Saratoga, CA (US)

( * ) Notice: Subject to any disclaimer, the term of this patent is extended or adjusted under 35 U.S.C. 154(b) by 46 days.

(21) Appl. No.: 15/999,218

(22) Filed: Aug. 16, 2018

(65) Prior Publication Data

US 2019/0057408 A1     Feb. 21, 2019

Related U.S. Application Data

(60) Provisional application No. 62/546,450, filed on Aug. 16, 2017.

(51) Int. Cl.
*G06Q 30/02*     (2012.01)
*G06K 9/62*     (2006.01)
*G06N 20/00*     (2019.01)

(52) U.S. Cl.
CPC ....... *G06Q 30/0204* (2013.01); *G06K 9/6227* (2013.01); *G06K 9/6282* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2002/0129342 A1* | 9/2002 | Kil | ...................... | G06F 16/2465 717/137 |
| 2002/0154173 A1* | 10/2002 | Etgen | .................. | G06F 3/04855 715/833 |
| 2003/0144897 A1* | 7/2003 | Burruss | .................. | G06Q 30/02 705/7.31 |
| 2007/0198320 A1* | 8/2007 | Lloyd | ................ | G06Q 30/0202 705/7.31 |
| 2007/0208639 A1* | 9/2007 | Lloyd | .................... | G06Q 40/06 705/35 |
| 2010/0236253 A1* | 9/2010 | Adam | ..................... | H02J 3/386 60/780 |
| 2013/0014057 A1* | 1/2013 | Reinpoldt | ........... | G06F 3/04847 715/833 |
| 2016/0005055 A1* | 1/2016 | Sarferaz | ................. | G06Q 10/04 705/7.31 |

(Continued)

OTHER PUBLICATIONS

Remarks by Director Iancu at the Artificial Intelligence Intellectual Property Considerations event Jan. 31, 2019 https://www.uspto.gov/about-us/news-updates/remarks-director-iancu-artificial-intelligence-intellectual-property (Year: 2019).*

*Primary Examiner* — Octavian Rotaru

(57) ABSTRACT

Different embodiments to generate predictive models to predict factors regarding a product are disclosed. In one embodiment, a computing apparatus and/or method can generate the predictive models using Ensemble Model algorithms, such as the Random Forest Modeling algorithms, with the apparatus and/or method providing a number of user interfaces to allow a user to enter the user's domain knowledge regarding at least the product to help generate the predictive models.

11 Claims, 4 Drawing Sheets

(56) References Cited

U.S. PATENT DOCUMENTS

| | | | |
|---|---|---|---|
| 2018/0060738 A1* | 3/2018 | Achin | G06Q 10/04 |
| 2018/0101788 A1* | 4/2018 | He | G06N 5/04 |
| 2018/0165604 A1* | 6/2018 | Minkin | G06N 5/022 |
| 2018/0308160 A1* | 10/2018 | Liu | G06Q 40/025 |
| 2019/0228362 A1* | 7/2019 | Anagnostou | G06N 5/02 |

* cited by examiner

METHODS AND APPARATUS TO GENERATE HIGHLY-INTERACTIVE PREDICTIVE MODELS BASED ON ENSEMBLE MODELS

CROSS-REFERENCE TO RELATED APPLICATIONS

This application claims benefit of U.S. Provisional Patent Application No. 62/546,450, filed Aug. 16, 2017, and entitled "METHOD AND APPARATUS TO GENERATE HIGHLY-INTERACTIVE PREDICTIVE MODELS," which is hereby incorporated herein by reference.

FIELD OF THE INVENTION

The present invention relates to generating predictive models and, more particularly, to generating interactive predictive models based on Ensemble modeling algorithms.

BACKGROUND OF THE INVENTION

Predictive modeling for marketing campaigns have been used for goods and/or services. They are typically for repeat sales from existing customers, when the repetition period is not too long. Examples of applicable products could be tickets for sport games, tickets for plays, and clothing.

Predictive modeling is usually done intuitively. To illustrate, assume a marketer tries to market a product. Based on her gut feelings, the marketer picks a few attributes that she thinks are important for the product, such as 3-5 attributes. Then she sets an industry or probable range for each of the attributes, and buys a list of contact information of individuals with the set of attributes falling under the ranges. After getting the list, the marketer targets them accordingly.

For example, assume the marketer is working on selling season tickets for a sports team to residents in a city. Based on her gut feelings, she believes that the three most important areas affecting sales are sex, age and beverage preference. So, she picks these three as the attributes. Then she sets a range/value for each, such as male for sex, 25-50 for age, and beer for beverages. Based on the settings, the marketer goes and buys a list of contact information for people in the city falling under the ranges/values for each of the attributes. Once the marketer gets the list of contact information, she would put together a campaign to market the season tickets to them. As one can see, success or failure depends a lot on how good the marketer's gut feelings are.

Some companies try to reduce relying on marketers' gut feelings by using data analytics to generate predictive models. They would collect as much data as possible on the factors they want to predict together with the different attributes influencing the factors. Then they would hire a data scientist to pick different algorithms to try to find patterns in the data that best fit the results. By trial and error, the data scientist may be able to find an algorithm that seems to fit the data. But correlation may not equate to causation. To illustrate, from 2000 to 2009, total revenue generated by skiing facilities seems to track quite well with the number of people died tangled in their bedsheets. To increase skiing facility revenue, should a skiing facility focus on creating ways to change bedsheet tangling?

Accordingly, at least there is a need for methods and systems to improve ways to generate better predictive models, such as without totally relying on the gut feelings of marketers.

SUMMARY OF THE INVENTION

In one embodiment, a computing system is configured to generate predictive models to help push a product, which could be, for example, a service. The computing system can use different machine learning algorithms, such as Ensemble Modeling algorithms, and includes user interfaces to allow one or more users to bring in domain knowledge, such as regarding the product. Though different Ensemble Modeling algorithms could be used, Random Forest Modeling algorithms have been selected to illustrate a number of embodiments.

In one embodiment, to generate predictive models, the computing system uses source data received. These include, for example, previous sales data on the product, together with corresponding customer information.

The source data can be categorized under a number of attributes. At least one of the attributes could correspond to one or more factors to be predicted.

For at least a plurality of the attributes, the computing system could classify the source data under each of them under a type. For example, the type could be categorical or binary.

In one embodiment, the computing system could edit the source data, such as to check and correct for errors and redundancy.

The computing system could provide a user interface to enable a user to edit the source data. For example, the user could change the data type of a set of data under an attribute, and the user could correct errors and/or reduce redundancy in the source data based on, for example, the user's domain knowledge, such as regarding the product.

The computing system could receive user input to generate a first predictive model for a factor. The factor could be, for example, customer churn rate for season ticket sale in a city. The source data could include data regarding a number of customers who have bought the season ticket in the city.

In one embodiment, the computing device could select from all of the attributes a group of them as selected attributes in view of the factor identified. The selected attributes could be attributes that could affect or are relevant to the factor. For example, one attribute selected for the factor on season ticket sale in a city could be the attribute on city.

In one embodiment, the computing system could allow a user to select an attribute as the user-selected most important attribute affecting the factor.

The list of selected attributes can be separated into demographic selected attributes, and logistic selected attributes.

In one embodiment, the computing system could provide a user interface to enable the user to edit the list of selected attributes. For example, the user could change a selected attribute from being characterized as a logistic to a demographic selected attribute.

In one embodiment, the source data under the selected attributes could be separated into two groups. One group, a training set, can be for training; and the other group, a validation set, can be for validating the trained results.

In one embodiment, based on the training set, the computing system could generate a number of weak learning models for the factor. The weak learning models could be generated by applying the Random Forest Modeling algorithms on the source data in the selected attributes. Each weak learning model could be a tree.

In one embodiment, a number of strong learning models can be generated by combining different numbers of weak learning models or trees. The number of strong learning models to be generated can be determined by a user. For example, the user could decide to generate four strong learning models, and each could include a different number of trees, such as 15, 25, 50, and 100 respectively. In one approach, the number of trees in each strong learning model can be randomly selected from all the trees generated.

In one embodiment, based on the validation set, the computing system could select one of the strong learning models generated to be the best model to use, which in this case becomes the first predictive model. The selection process can be based on, for example, Receiver Operator Curves. For example, the model with 25 trees can be selected as the best model to use, or the first predictive model.

The computing system could also provide a user interface to a user to allow the user to provide inputs regarding the selection of the first predictive model.

Based on the predictive model selected for the factor, the computing system could identify an attribute as the system-identified most important attribute affecting the factor. This attribute could be different from the user-selected most important attribute affecting the factor. In one embodiment, the difference between the system-identified one and the user-selected one could help identify a relative return on investment regarding using the computing system to identify predictive models.

In one embodiment, the first predictive model can be used for a marketing campaign for the factor regarding the product next month. For example, the first predictive model could be used to reduce the customer churn rate of the season ticket sale in the city next month, which for illustration purposes is the month of June.

In one embodiment, based on the first predictive model, the probability of churning of each customer in the city can be predicted. A user could specify the number of customers to approach for the first marketing campaign next month. In one embodiment, customers with higher probability of churning falling under the number specified by the user can be identified and approached.

After the marketing campaign, the results of the season ticket sale in the city for the month of June could be collected. These data could be entered back into the computing system as additional source data, to update the source data.

One embodiment could generate a second predictive model to predict the customer churn rate of the season ticket sale in the city for the month of August, for example. The computing system could generate a percentage depending on the ratio of the number of logistic selected attributes and the number of demographic selected attributes.

For the trees under the first predictive model, the computing system can randomly select from them to form a group of selected trees, with the number selected depending on the percentage.

In one embodiment, the trees not selected can be kept stable or constant. This could reduce the impact of each selected attribute, diminish the chance of overemphasizing any one of the selected attributes, and/or create more stable predictive models.

In one embodiment, the computing system can generate the second predictive model by applying the Random Forest Modeling algorithms on the updated source data under the selected attributes. But in generating the second predictive model, the Random Forest Modeling algorithms can be applied only to the selected trees.

In one embodiment, the trees under the second predictive model includes the trees kept stable (a number of trees in the first predictive model), plus the updated selected trees.

Note that the computing system could provide a number of user interfaces for a user to at least enter user's domain knowledge regarding the product into the system to assist in generating predictive models.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
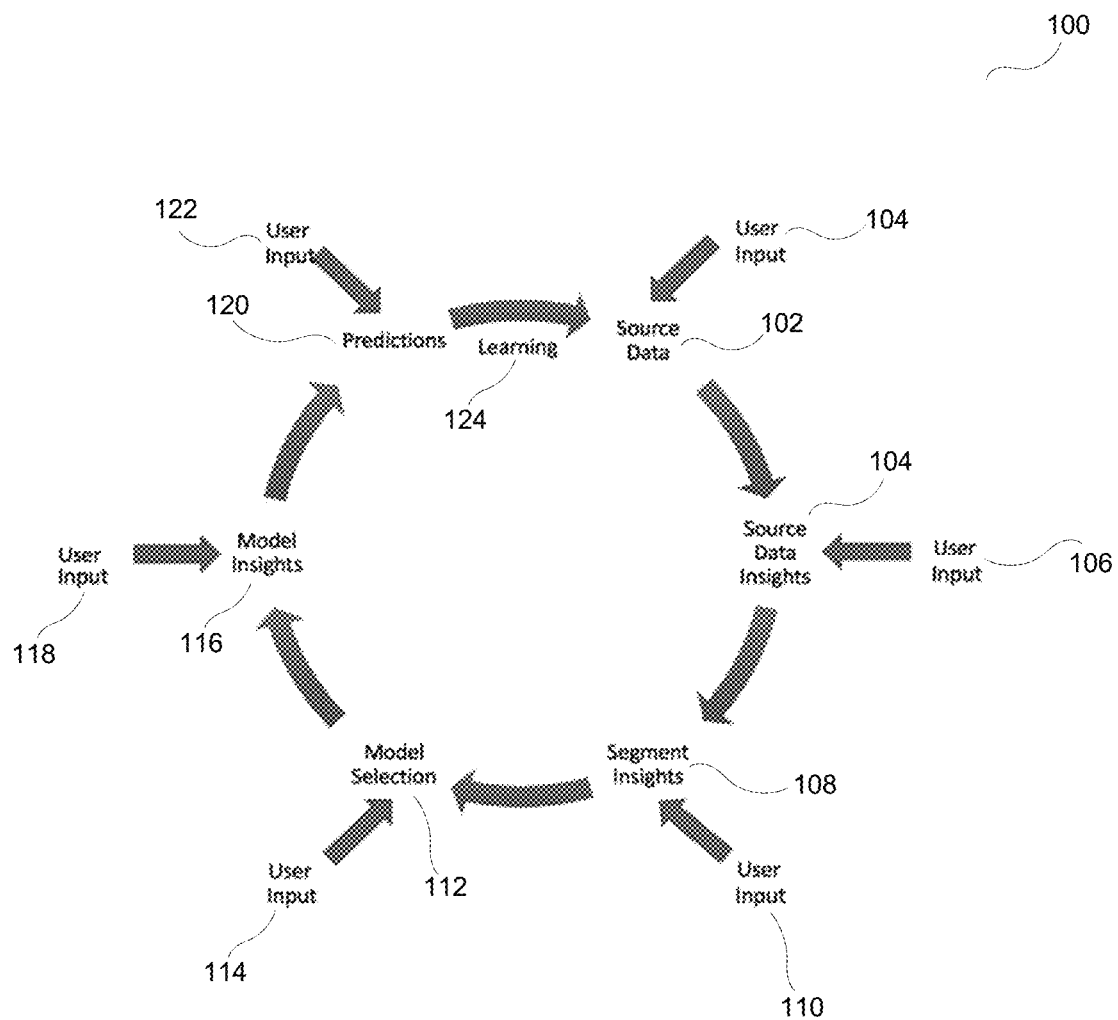
FIG. 1 shows one embodiment with a number of user interfaces allowing user inputs to help generate predictive models.

FIG. 1 shows one embodiment 100 of a computing system with a number of user interfaces allowing user inputs to help generate predictive models to, for example, push a product.

The different user interfaces allow user interactions at different strategic locations, and the user interactions could help extract domain knowledge, such as about the product, from one or more users. Based on the extracted domain knowledge, better predictive models can be generated. The embodiment 100 could enable users to customize predictive models to their business, even if the users may not be experienced in the area of predictive modeling.

In the embodiment 100, a computing system receives or accesses source data 102, which could be used to generate predictive models for the product. These data could include, for example, previous sales data on the product, together with corresponding customer information. A user via a user interface could provide user input 104 to modify the source data based on the user's domain knowledge regarding, for example, the product. The process to provide user input, such as to make changes based on the user's domain knowledge, can be done through friendly user interfaces, such as via drag and drop processes.

In one embodiment, the computing system could operate on the source data to provide insights 104 regarding the data to a user. Based on the insights provided, a user could enter inputs 106 to the computing system to change the source data.

In one embodiment, the source data could be segmented into different areas for different purposes, such as to predict different factors. The computing system could analyze the source data according to the different segments, and provide segment insights 108 to a user. The user could enter inputs 110 to the computing system to, for example, change the source data or identify different ways to segment the source data.

In one embodiment, the computing system could use different algorithms to analyze the source data (such as in different segments) to generate different models. A user could provide inputs to the computing system on the algorithms to use.

In one embodiment, one or more predictive models could be generated or selected 112 from the models based on different criteria. A user could provide inputs 114 to the computing system on the generation or selection of the predictive models.

In one embodiment, the computing system could analyze the predictive models to provide insights 116 to a user, and the user could provide inputs 118 to the computing system, which could change the predictive models.

In one embodiment, the computing system could generate predictions 120 using the predictive models. A marketing campaign can be launched based on the predictions. A user could provide inputs 122 to the computing system based on the results of the marketing campaign, and results from the marketing campaign can be entered into the computing system, to update the source data. Predictions can be compared to actual results from the launched campaign. A user could learn 124, such as, from the comparison. And the process in the embodiment 100 could repeat, based on, for example, the updated source data.

In one embodiment to generate predictive models for a product, which could be a service, a computing system could receive source data related to the product, and the source data could be in one or more files. The files could be uploaded by a user via a user interface to the computing system. The data can be in different formats, such as CSV format.

In one embodiment, a file of source data could have many tables and can be joined by standard join techniques. Each table could have many rows and/or many columns. For example, each row could provide information regarding a person and each column in a row an attribute regarding the person. To illustrate, one column could designate the sex of different people and another their corresponding age. One entry for a column, such as the top entry, could identify the type of data in that column. These identifying entries could be provided by a user.

In one embodiment, the computing system can automatically identify data types. For example, a column of data with up to 10 distinct values can be classified as categorical data. The computing-system identified data types can be in another entry of the column, such as the second entry of the column. In one embodiment, a data type for a column of data could be provided by a user, and the data type provided by the system could be different from those provided by the user. The user could be asked to resolve the differences.

In one embodiment, the computing system could provide a user interface to allow a user to change or update the data types based on the user's domain knowledge, such as regarding the product. For example, a column with ten entries has been initially classified by the system as categorical because the ten entries are all different. But they are in fact binary data, such as able to fit into either yes or no. Via a user interface, the computing system could enable the user to change the data type as binary and identify the corresponding ranges of values mapping to yes and no respectively.

In one embodiment, the computing system could keep track of changes made by the user. For example, if the user has changed the data type of a column of "Monthly Charges" from integer to decimal, the computing system could keep track of the changes. In another embodiment, machine learning algorithms can be used to predict changes in data types for other or future source data, based on changes in data types made by the user.

Figure 2:
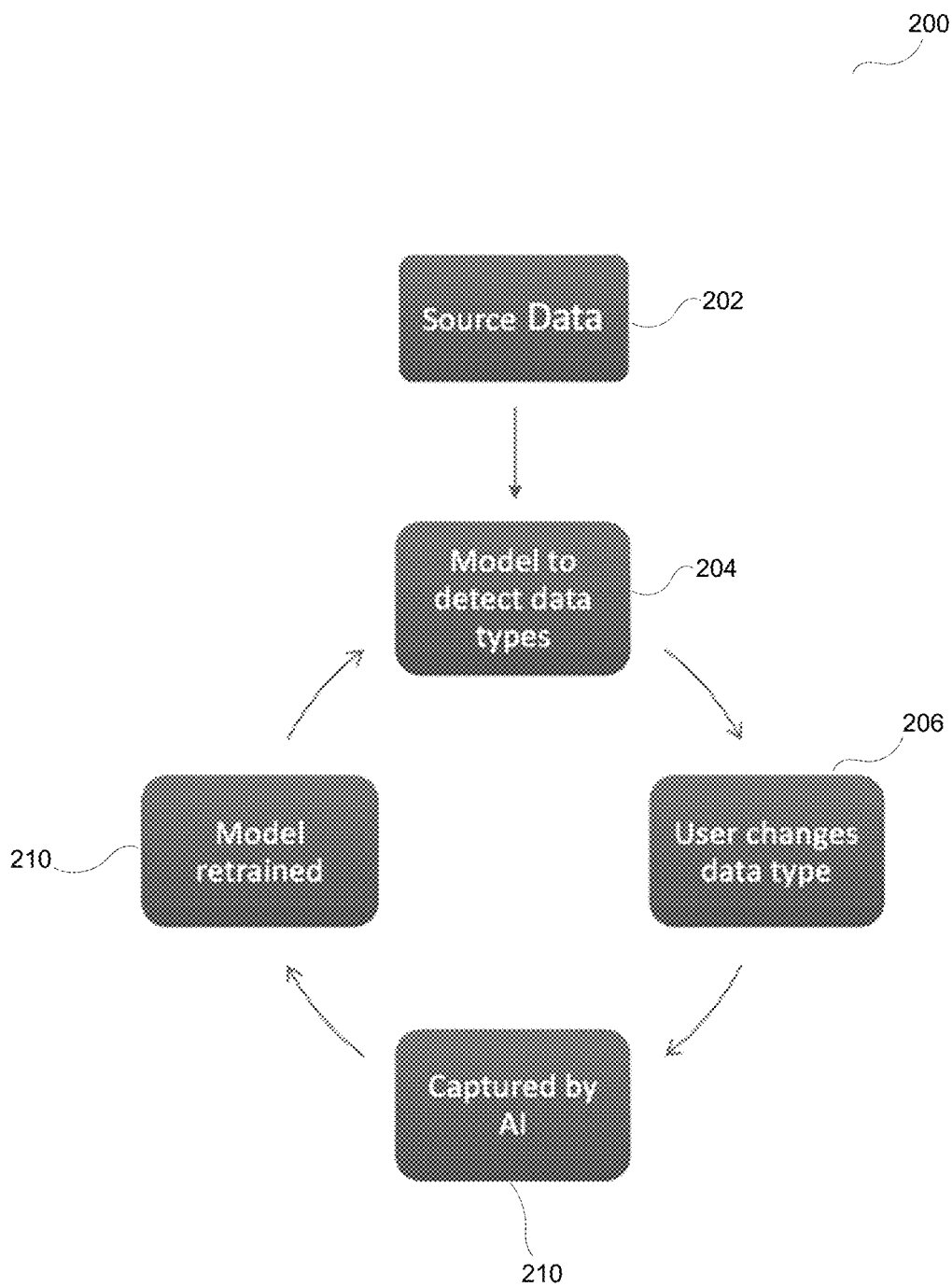
FIG. 2 shows one embodiment using AI, including machine learning, to help generate predictive models.

FIG. 2 shows one embodiment 200 regarding the use of AI, such as machine learning, to help generate predictive models. A computing system receives or gains access to source data 202. The system uses one or more approaches 204 to detect data types of the source data, and operates on them. For example, the computing system could assume the source data as binary and use support vector machines to classify the source data accordingly. As another example, the computing system could use one versus rest techniques to reduce a multi-class problem into multiple binary problems.

The computing system could provide an interface to allow a user to change 206 the data type. To illustrate, the user could change the data type from binary to categorical data with a number of possible values.

In one embodiment, the computing system can capture 208 the changes made. Then the computing system can use at least machine learning techniques, a branch of artificial intelligence, to analyze the source data to help generate predictive models.

For example, the computing system could use Random Forest Modeling algorithms to analyze the source data to generate one or more predictive models. Based on the one or more predictive models generated, a marketing campaign could be launched. Results from the campaign could be added back into the system, such as to update the source data, to retrain 210 the one or more predictive models previously generated. And the process could repeat.

In one embodiment, the computing system allows additional data to be included as source data. For example, if a piece of data contains an address, public data about the person who lives at that address can be introduced as source data. This could provide additional insights to the predictive models.

In one embodiment, if the source data includes natural-language data, the natural-language data can be further analyzed via natural language processing algorithm, such as the word2vec algorithm. For example, if the source data includes data regarding user dialogue at a company's call center, such data can be analyzed to determine whether the dialogue is related to complaints.

In one embodiment, some of the source data can be removed if, for example, they are redundant and/or do not materially affect the outcome of the predictive models. To illustrate, the computing system can identify data in a column that can be derived from source data in other columns. Such a column could be removed. For example, the computing system can perform correlation analysis to identify data in columns or attributes that can be excluded. The computing system could also include a user interface to ask for user input regarding removing source data. To illustrate, if the modeling is for predicting defaults, a user, based on her domain knowledge, may want to exclude a penalty attribute that almost always leads to defaults. Based on a user interface, the user could remove the penalty attribute.

Different companies in different industries may be interested in predicting different factors. In one embodiment, the computing system can provide a user interface to allow a user, based on her domain knowledge, to select or identify one or more factors. Through the identification, the system could provide insights to the user regarding the corresponding source data, and allow the user to edit the corresponding source data, if necessary.

For example, a user could direct the computing system to predict a factor. The user could also direct the computer system to focus on one or more segments of the source data with a number of attributes to be analyzed for predicting the factor.

To illustrate, the user may be interested to analyze one factor regarding the NBA Home Playoff based on one segment of the source data, and another factor regarding the NBA Finals based on a wider segment of the source data. In one embodiment, based on the above interests, the computing system could provide certain insights to the user regarding the source data, and/or allow the user to sanity check the source data for the different factors.

For example, a factor could be ticket sales for certain movies. The computing system could provide graphs to the user showing the distribution of values for certain attributes regarding users going to the certain movies. To illustrate, a graph provided to the user shows significantly more males than females in the source data. Based on the user's domain knowledge, the distribution should be even. The graph would alert the user that some source data could be incorrect.

In another example, the computing system could identify certain data to be statistical outliers. To illustrate, some data could be significantly deviated from the mean, and the system could alert the user accordingly. If the user agrees with the alert notification, those data could be removed.

In yet another example, via, for example, correlation analysis, the computing system has identified certain attributes as candidates to be excluded. The computing system could alert the user and let the user make the final decision. Such sanity checks could help improve the source data for subsequent modeling and prediction.

In one embodiment, based on the one or more factors identified to be predicted, the computing system could identify a number of attributes to be used, and the system could provide a user interface to allow a user to edit, such as add or remove, attributes to predict the one or more factors. To illustrate, the user has selected churn flag as the factor to predict. The system could identify the following ten attributes as relevant for the prediction: Phone call Escalated, Vintage Year, Phone Call Normal Queue, Email Low Priority, Vintage Hour, State, Job, Income, Vintage Day, and Number of Children. Such identification can be based on inputs from the user. The attributes Vintage Year, Day and Hour could designate respectively the year, day and hour when someone first became a customer. Then the computing system could identify at least one modeling algorithms to predict churn flag based on the set of selected attributes.

In one embodiment, the computing system could allow a user to select an attribute as the user-selected most important attribute affecting the factor. For example, the user may select Vintage Year as the most important attribute affecting the churn flag.

In one embodiment, the computing system could automatically select one or more modeling algorithms in view of, for example, attributes of the source data, such as the identified data types of the source data. To illustrate, the computing system can select regression techniques to apply to continuous variables and binary data.

In one embodiment, to determine a predictive model, a certain percentage of the corresponding source data can be reserved as a hold-out set or validation set. This can be known as cross validation. For example, the total set of source data under the selected attributes could be separated into two groups. One group, the training set of data, can be used for training or generating models. The other group, the validation set of data, can be used for validating the trained or generated models.

For example, one could reserve 20% of the source data under the selected attributes for the validation set, and use the remaining 80% of the source data under the selected attributes for the training set to generate a number of models. In one embodiment, whether a piece of data falls under the 20% or 80% can be randomly selected.

In one embodiment, the computing system could apply the Random Forest Modeling algorithms on the training set of data to generate a number of weak learning models or trees for the factor.

In one embodiment, the computing system could allow a user to determine the number of strong learning models to be generated from the weak learning models. For example, the user could set four strong learning models to be generated. The different strong learning models could include a different number of trees. For example, the user could determine the number of trees for the four strong learning models to be 15, 25, 50, and 100 respectively. In one embodiment, the trees to be in each of the strong learning models could be selected randomly from the weak learning models. To illustrate, to generate the strong learning model with 25 trees, the computing system could randomly select 25 trees out of all the trees generated.

In one embodiment, based on the validation set of data, the computing system could select one of the strong learning models to be the best model to use, which, in this case, can be designated as a first predictive model. For example, the different strong learning models could be applied to the validation set of data to generate cumulative gain charts, lift charts, and Area Under the Curve (AUC) of Receiver Operator Curves (or ROC). In one approach, the strong learning model having the largest AUC when applied on the validation set of data can be considered the strongest and could be selected as the first predictive model. For example, the strong learning model with 25 trees can be selected as the first predictive model.

In one embodiment, the computing system can split source data into cohorts to be separately analyzed. To illustrate, the computing system can split a segment of source data into 2 separate data sets, such as one for male and the other for female. In one embodiment, the computing system could use the Random Forest Modeling algorithms or other algorithms to create a predictive model for each of the two sets of data. Assume the predictive model is stronger (such as better matches to the validation set of data) for the male than for the female data sets. Then a user could focus her next marketing campaign on male customers.

In one embodiment, based on a predictive model for a factor, a user could identify attributes that are more important in driving the factor. For example, if the male set of data shows that the factor is significantly driven by one attribute and the female set of data shows that the factor is significantly driven by a different attribute, then marketing approaches for males and females should be done differently based on the different attributes.

In one embodiment, the computing system could provide a user interface to a user to allow the user to provide inputs regarding the selection of the first predictive model from the strong learning models.

In one embodiment, based on the predictive model selected, the computing system could identify an attribute as the system-identified most important attribute affecting the factor.

Figure 3:
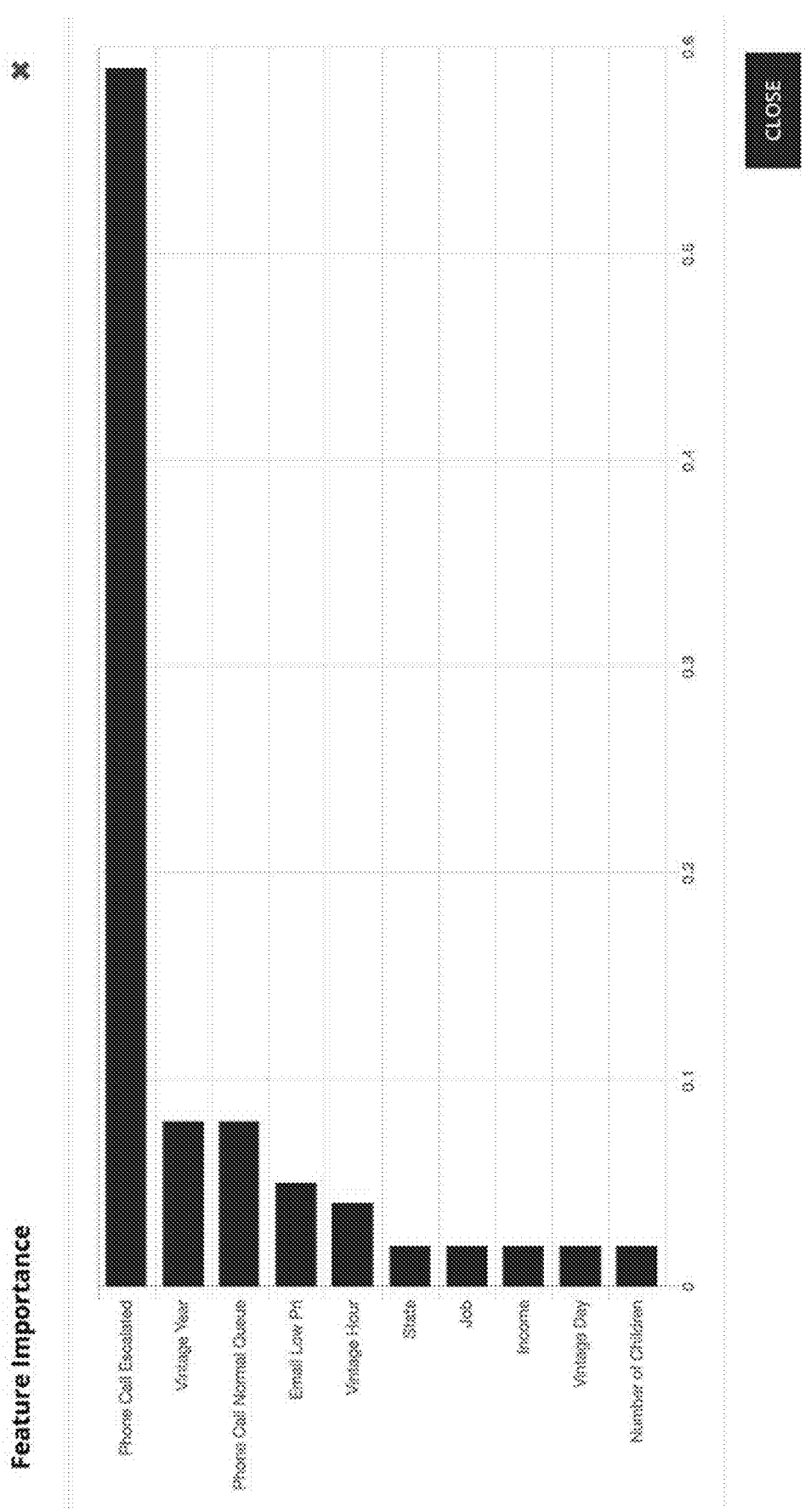
FIG. 3 shows an example of a list of attributes prioritized based on their importance in affecting a factor to be predicted.

FIG. 3 shows an example of a list of selected attributes prioritized based on their importance in affecting a factor, as identified by a predictive model. In this example, the system-identified most important attribute affecting the factor is Phone Call Escalated. This attribute can be different from the user-selected most important attribute affecting the factor.

In one embodiment, the difference between the system-identified most important attribute and the user-selected most important attribute could be used to help identify a relative return on investment regarding using the computing system to generate predictive models. For example, the system-identified most important attribute is Phone Call Escalated, and the user-selected most important attribute is Vintage Year. Then in one approach, the difference between the AUC of the ROC based on Phone Call Escalated (the system-identified one) and based on Vintage Year (the user-selected one) could be used as an indicator of the return on investment regarding using the computing system to generate predictive models. Note that in one embodiment, the ROC for the user-selected most important attribute could be generated based on the relative order of importance of the different attributes, as identified by the user. And in this case, the user order of the list of attributes indicates that Vintage Year is the most important user-selected attribute.

In one embodiment, when a user is satisfied with a predictive model identified, the user can use the model to predict future outcomes.

In one embodiment, the first predictive model can be used for a first marketing campaign for the corresponding factor. For example, if the predictive model was generated based on source data up till February, the user can leverage the model to try to understand user behavior in March.

To illustrate, the factor is to reduce the churn rate of the season ticket sale in the city next month, which, for illustrative purposes, is the month of March. A first predictive model was generated based on an old set of customer data. And, a new set of customers can be identified.

Based on the first predictive model, the probability of churning of each customer in the new set of customers can be predicted. A user could specify the number of customers to approach for a first marketing campaign. Let's say the number is 1000. Then the thousand customers with a higher probability of churning than other customers could be identified for the first marketing campaign.

In one embodiment, after the campaign, the computing system can compare actual outcomes in March with predicted outcomes, and provides the comparisons to the user.

And, the results of the churn rate for the month of March could be entered into the computing system to update the source data. The system can perform predictive modeling again for the month of April, for example, based on the updated source data.

In yet another embodiment, the computing system could provide a user with predictions, while continuing to make sure that the process is behaving within expectation, as set, for example, based on thresholds determined by the user. The computing system could alert the user when the prediction starts to perform outside of the expectation, or beyond the thresholds.

In one embodiment, source data could be generated in real time. For example, the computing system could be electronically coupled to another computing system to bring in source data as those data are generated. The computing system can provide a set of API to the another computing system to bring in those source data in real time.

The success rate of a marketing campaign could be very low, such as 1%. Some marketers may focus on prior successes and home in on the 1%, missing other opportunities. In other words, they may have over-fitted prior successes.

To illustrate, in February, the computing system could use the Random Forest Modeling algorithms to generate a February predictive model to predict season tickets buyers. The February predictive model, for example, could identify one type of customers as highly likely to renew their season tickets. This group of customers had contacted a call center regarding the season tickets more than twice during the previous month, and they have a 95% chance of renewing their season tickets. It turned out that many of them had been calling the call center regarding upgrades.

In May, the computing system, again can use the Random Forest Modeling algorithms to generate a May predictive model to predict season tickets buyers. For this month, based on the May predictive model, the same type of customers is identified as highly unlikely to renew. These customers called the call center more than twice during the previous month, and they have a 15% chance of renewing the season tickets. It turned out that many of these customers had been calling the call center to complain.

In the above situations, the predictive models might have weighed certain attributes too heavily. For the February data, the attribute weighed too heavily was the attribute of contacting the call center a certain number of times, and that attribute was identified to lead to highly likely to renew.

In one embodiment, the impact of each individual attribute can be reduced, which in turn could diminish the possibility of overemphasizing any one attribute. This could create a more stable model in the long term.

In one embodiment, the computing system after generating a first predictive model, could hold some of the results stable, and would not operate on those results in generating subsequent predictive models. For example, in one embodiment, the computing system using the Random Forest Modeling algorithms could hold some of the trees generated in the first predictive model stable. Instead of updating all the trees, the computing system can just update some of the trees in generating subsequent predictive models.

One approach to pick the number of trees to be held stable can be based on the ratio of different types of attributes to generate the predictive model. In one embodiment, the predictive model can be based on a fixed number of selected attributes, with some attributes demographic attributes and other attributes behavior, or not demographic.

In one embodiment, a demographic attribute can be an attribute related to demographics, such as the address, gender, and age of a customer. These attributes could be more stable, with their corresponding values typically not changing from one market to the next.

In one embodiment, attributes that are not demographic could be classified as behavior attributes. In another embodiment, a behavior attribute can be an attribute related to behaviors of, for example, the customers of a product. Behavior attributes could be those that could depend on the product or business itself. Examples of behavior attributes include the number of tickets bought, and the number of calls made to a call center by a customer. In one embodiment, values of a behavior attribute can depend on the corresponding product or business.

In one embodiment using the Random Forest Modeling algorithms, the computing system could keep a certain percentage of the trees in the first predictive model stable. So, in generating a second predictive model, the computing system could just update the remaining trees.

In one embodiment, the percentage to be kept stable could be the number of demographic attributes over the total number of selected attributes. That number could set the percentage of trees in the first predictive model to be kept stable. So, if there are more demographic attributes, more trees could be kept stable.

To illustrate, a manager would like to reduce the churn rate of his customers. His previous churn rate was about 15%. Using the Random Forest Modeling algorithms, the manager has generated a first predictive model on the churn rate based on, for example, a set of source data with a corresponding group of attributes. The first predictive model has 25 trees. In the attributes used to generate the first predictive model, 40% of them could be classified as demographic attributes. So, to generate subsequent predictive models, in one embodiment, 10 of the 25 trees can be randomly selected to be kept stable.

Now the manager wants to push his product again. Based on an updated set of source data, the manager generates a second predictive model. In one case, to update the trees in the first predictive model for the next predictive model, the computing system could apply the Random Forest Modeling algorithms on the remaining 15 trees based on, for example, the updated set of source data.

In one embodiment, by holding some of the prior results stable, one could keep some of the history, which in turn may smooth out the results. In the case of using the Random Forest Modeling algorithms, by keeping some of the trees constant, the second predictive model may change less drastically from the first predictive model. Such an approach could mimic a certain degree of stability in real life data.

The second predictive model could determine that phone call escalated to be the most important attribute leading to increasing churn rate. Based on the second predictive model, the manager could decide to contact 15% (the previous churn rate) of the potential customers with higher churn rate than the remaining 85%.

Two weeks after the marketing campaign of contacting those customers, the manager collects the results of the churn rate of his customers. These data could be entered back into the computing system as source data, to update the source data. And the manager could compare his predicted results of reducing churn rate with the actual results.

As a side note, in one embodiment, assume a predictive model has been identified, and a user is about to launch a marketing campaign. To use the model to make predictions, the computing system could set a classification threshold to achieve a high accuracy rate. However, for some models, optimizing the numbers of, for example, true positives and false positive rate, can be more important than correctly identifying their exact values.

In one embodiment, to market a season ticket campaign to a city can involve contacting as many adults in the city as possible. And one could use email or phone call campaign. But compared to email campaign, a phone call campaign could be much more expensive if the number of targets becomes very large. In view of budget constraint, one approach could select a smaller sample of targets to call. The computing system can let the user, based on her domain knowledge and financial consideration, adjust the classification threshold for the ROC via a user interface to a lower accuracy rate. This could change the number of targets to approach and may be more appropriate, as decided by the user. By using a smaller sample size of the source data, typically, a user could get the corresponding marketing campaign results faster.

Figure 4:
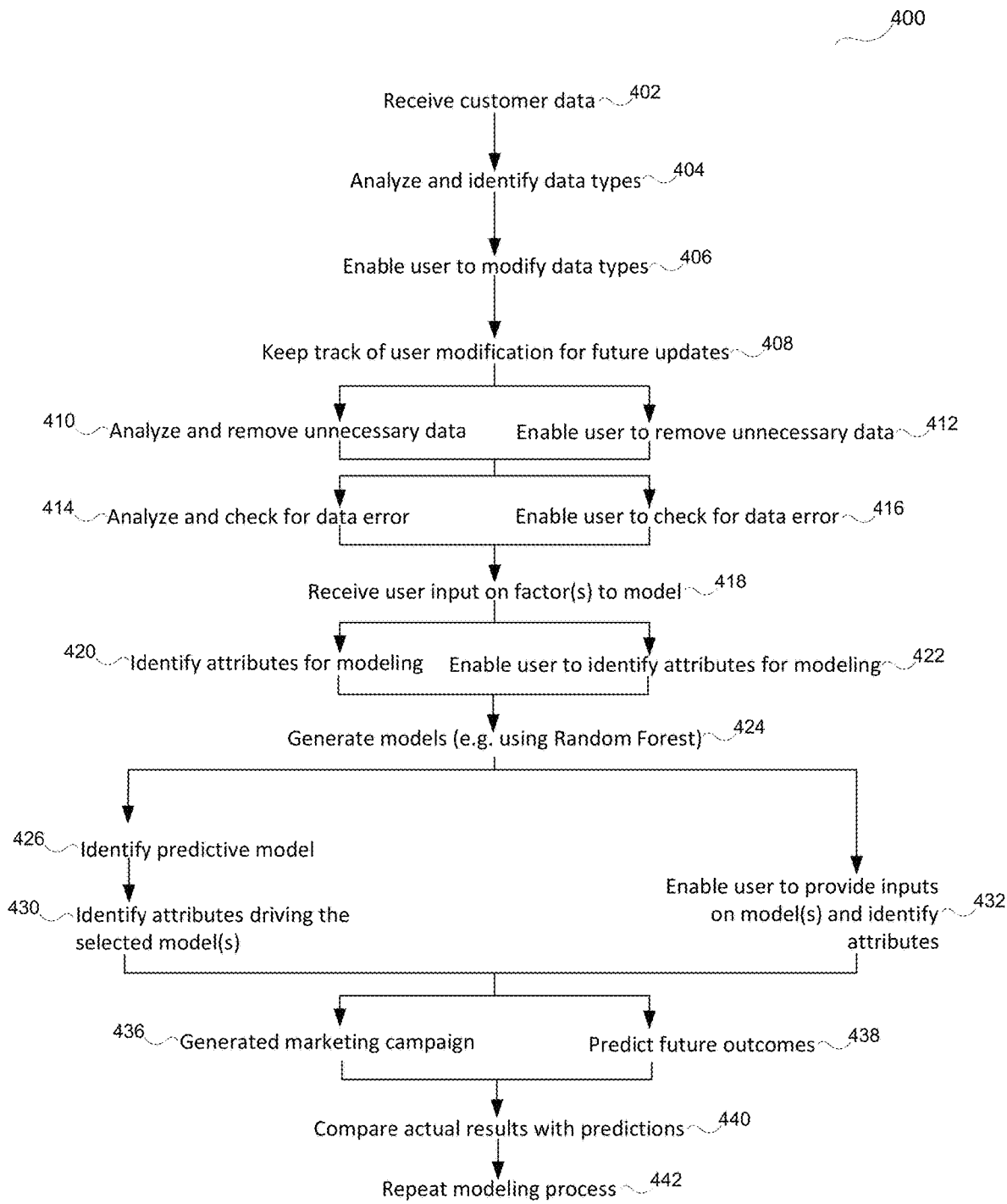
FIG. 4 shows one embodiment illustrating a number of steps to generate predictive models.

FIG. 4 shows one embodiment 400 regarding a process to generate predictive models performed by the computing system.

In one embodiment, the computing system can receive 402 source data, and analyze and identify 404 data types. A user interface can be provided to a user, enabling the user to modify 406 the data types identified. The system can keep track 408 of the user modifications for future updates of data types.

Some of the source data may be redundant. The system could analyze and remove 410 unnecessary data. A user interface can be provided to the user to enable the user to remove 412 source data, such as unnecessary data.

Some of the source data may have errors. The system could analyze and check for data error, and correct 414 accordingly. A user interface can be provided to the user to verify if the system has corrected mistakes appropriately, and to check 416 for data error.

Different factors could be predicted. The system could receive user inputs regarding the one or more factors to be predicted. To illustrate, one factor to be predicted can be the customer churn rate, and one column or portion of the data can be related to churn rates of a set of customers regarding a product. In another example, the factor to be predicted could be the number of users who would respond to an upcoming campaign. Yet another example of the factor can be predicting the expected lifetime return on investment of a current marketing campaign. Another example of the factor can be to predict the profile of an ideal customer based on the attributes considered.

Different attributes could be selected for the prediction. The system could decide 420 the attributes used for the prediction. This could be based on past activities of the system on related products. The system also could allow the user to identify 422 the attributes to be used for the prediction via, for example, a user interface. Or the user could edit or adjust the list of attributes selected by the system.

The system could generate 424 models for the factors, based on source data in the different attributes identified or selected.

In one example, the system could select 426 at least a first predictive model from the models generated based on, for example, validation or hold-out data. In one embodiment, for the first predictive model, the system could identify 430 more important attributes driving it. The computing system also could provide a user interface to enable 432 the user to provide inputs regarding selecting the first predictive model, and identify more important attributes driving the first predictive model.

In one embodiment, the first predictive model could predict the outcomes of the factor. For example, the first predictive model could predict the probability of the churn rate for season tickets.

The computing system could select a control group of potential customers to generate 436 or launch a marketing campaign. The control group can be identified based on different reasons, such as budget concerns. Via contact information in the control group, a marketing campaign can be launched. The computing system could also predict 438 the outcomes of the marketing campaign based on the first predictive model.

Results of the campaign could be loaded back into the system, and the system could analyze to determine how well the first predictive model has performed.

The system could compare 440 the actual outcomes of the marketing campaign with outcomes from the first predictive model. For example, the first predictive model predicts a 2% reduction in churn rate, and this could be compared to the actual outcomes.

In one embodiment, the results of the marketing campaign can be added into the source data to update the source data. The system could generate a second predictive model or subsequent predictive models, such as based on the updated source data.

For example, the first predictive model indicates that 5% would buy the season tickets if all the targets in Northern California are approached. Then a marketing campaign is launched in Northern California, and 1000 calls are made. It turns out that 10% in San Francisco buy the tickets, but only 3% in San Jose buy the tickets. The computing system can automatically update the source data by adding the campaign results back to become part of the source data. And the modeling process could be repeated 442 to generate the second predictive model. Based on the second predictive model, a subsequent marketing campaign can be launched.

A number of embodiments have been described using the Random Forest Modeling algorithms. The Random Forest Modeling algorithms is an example of Ensemble Model algorithms. Another example of Ensemble Model algorithms can be Bayes Optimal Classifier algorithms.

In one embodiment, the computing system could apply an Ensemble Model algorithm to a set of source data to predict a factor for a product. The source data regarding the product can be categorized under a number of attributes. The attributes, for example, could be divided into demographic attributes and behavior attributes.

The source data under the attributes could also be separated into a training set of source data and a validation set of source data.

A user wants to generate a predictive model for the factor. The computing system could apply the Ensemble Model algorithms on a set of source data to generate a set of weak learning models. In one embodiment, the computing system could apply the Ensemble Model algorithms just to the training set of source data to generate a set of weak learning models.

Each weak learning model can be built based on some of the source data, but not all of the source data. For example, each weak learning model can be built based on source data under some, but not all, of the attributes. In one embodiment, each weak learning model includes just a subset of the information provided. In the case of using the Random Forest Modeling algorithms, a tree can be a weak learning model, and all the trees can be generated based on a portion of the source data, which can be the training set of the source data.

A number of strong learning models can be generated from the weak learning models. Each strong learning model can include a different number of weak learning models. In one approach, the user could decide the number of weak learning models to be combined into each of the strong learning models. To illustrate, in the case of Random Forest Modeling algorithms, the user could decide that three strong learning models could be generated, having 20, 40, and 150 trees respectively. Trees in each strong learning model could be randomly selected from all the trees.

In one embodiment, the predictive model to predict the factor could be selected out of the strong learning models. There could be different techniques to select the predictive model out of the multiple strong learning models. For example, one could be selected at random. In one approach using the Random Forest Modeling algorithms, the selection process involves applying ROC and AUC on the validation set of data. In yet another approach, a new set of source data could be used to help select the one strong learning model, which could be the strong learning model that best fits the new set of source data.

The first predictive model could help a user run a marketing campaign to push the product. After the campaign, a new set of data regarding the product and the customers could be collected. This new set of data could be used to update the source data.

To generate a subsequent predictive model, in one approach, a number of the weak learning models in the first predictive model can be kept constant. Then the Ensemble Modeling algorithm can be applied to the weak learning models not kept constant to update them based on the updated source data. And the subsequent predictive model can be generated by combining the weak learning models kept constant together with the updated weak learning models.

In one embodiment, the percentage of weak learning models kept constant can depend on the number of demographic attributes over the total number of attributes. The computing system could randomly select from all the weak learning models in the first predictive model a reduced number of them, with the number reduced being the percentage.

The computing system could update the selected weak learning models in the first predictive model by applying the Ensemble Modeling algorithms to at least a portion of the updated source data.

In the case of the Random Forest Modeling algorithms, a number of trees in the first predictive model can be kept constant, and the Random Forest Modeling algorithms can be applied to the other trees to update them.

A second predictive model could then be generated to predict the factor by combining the updated weak learning models with the weak learning models not selected.

One embodiment involves generating predictive models to predict a factor for a product using Ensemble Modeling algorithms includes the process of (a) generating many models via applying the Ensemble Modeling algorithms on source data for the factor, with each model based on just a portion of the source data, with the source data categorized under many attributes, and with the attributes separated into demographic attributes and non-demographic attributes; (b) generate a first predictive model from the models, with the predictive model including a number of the models; (c) update the source data; (d) generate a second predictive model (i) based on keeping a portion of the models in the first predictive model constant, with the portion depending on the ratio of demographic attributes to non-demographic attributes, and (ii) based on updating the remaining portion of the models by applying the Ensemble Modeling algorithms on the updated source data; and (e) providing user interfaces for a user to enter information at least regarding the product to assist in generating the predictive models.

A number of computing systems have been described. In one embodiment, the computing system could include a server. In another embodiment, the computing system could include a client computer wirelessly connected via the Internet to direct another computer, or groups of servers, to perform a number of the processes, such as one or more servers in Amazon Web Services. In one embodiment, the source data or at least a portion of the source data, could be stored locally, such as in the client computer, instead of remotely, such as in the groups of servers.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The various embodiments, implementations, features and aspects of the invention noted above can be combined in various ways or used separately. Those skilled in the art will understand from the description that the invention can be equally applied to or used in other different settings with respect to various combinations, embodiments, implementations or features provided in the description herein.

What is claimed is:

1. A computing apparatus for generating predictive models regarding a product using Random Forest Modeling algorithms, the computing apparatus comprising:
   at least one computing device; and
   one or more storage devices coupled to the at least one computing device, with the one or more storage devices storing instructions that, when executed, cause the at least one computing device to:
   receive source data regarding the product, with the source data categorized under a plurality of attributes;
   edit the source data;
   select from the plurality of attributes at least some of the attributes to serve as a group of selected attributes based on a factor to be predicted, with the group of selected attributes separated into logistic selected attributes and demographic selected attributes;
   calculate a percentage based on a number of the demographic selected attributes and a number of the logistic selected attributes;
   separate the source data under the group of selected attributes into a training set of the source data and a validation set of the source data;
   generate, using machine learning, a plurality of trees by applying the Random Forest Modeling algorithms on the training set of the source data for the factor, with each of the trees depending on only a portion of the training set of the source data;
   generate a plurality of strong learning models, with each strong learning model including a different group of trees generated;
   select one of the strong learning models as a first predictive model to predict the factor, with the select depending on the validation set of the source data;
   select a reduced number of trees from all the trees in the first predictive model to form a reduced number of trees, with the reduced number depending on the percentage;
   update, using machine learning, each of the trees in the selected trees in the first predictive model by applying the Random Forest Modeling algorithms on at least a portion of the source data or updated source data if the source data is updated for the factor; and
   generate a second predictive model to predict the factor by combining the updated trees with a plurality of the trees not selected in the first predictive model,
   wherein the second predictive model results from retraining of the first predicting model, the retraining being assisted at least in part by machine learning, and the retraining including at least (i) the select of the reduced number of trees from the first predictive model and (ii) the update of the selected trees by applying the Random Forest Modeling algorithms,
   wherein the instructions when executed cause the at least one computing device to:
   provide a plurality of user interfaces for the user to enter information regarding at least the product to assist in generating the first predictive model and the second predictive model, and
   wherein among the plurality of interfaces, a user interface is configured for the user to change a characteristic of an attribute to assist in generating at least one of the first predictive model and the second predictive model.

2. The computing apparatus for generating predictive models as recited in claim 1, wherein the select of the reduced number of trees from the first predictive model is a random selection.

3. The computing apparatus for generating predictive models as recited in claim 1, wherein the instructions, when executed, further cause the computing apparatus to analyze the source data under at least some of the attributes so that the source data under each of the at least some of the attributes are classified under a type.

4. The computing apparatus for generating predictive models as recited in claim 3, wherein the type is binary.

5. The computing apparatus for generating predictive models as recited in claim 3, wherein the type is categorical.

6. The computing apparatus for generating predictive models as recited in claim 1, wherein the edit of the source data includes at least correcting the source data for errors or for redundancy.

7. The computing apparatus for generating predictive models as recited in claim 1, wherein to provide a plurality of user interfaces, the at least one computing device operates to:
provide a particular user interface to enable the user to influence the edit of the source data; and
provide another user interface to enable the user to provide one or more inputs regarding the select of one of the strong learning models as the first predictive model.

8. The computing apparatus for generating predictive models as recited in claim 1, wherein to provide a plurality of user interfaces, the at least one computing device operates to:
provide a particular user interface to enable the user to provide one or more inputs to influence the edit of the source data.

9. The computing apparatus for generating predictive models as recited in claim 1, wherein to provide a plurality of user interfaces, the at least one computing device operates to:
provide a particular user interface to enable the user to edit the selected attributes.

10. The computing apparatus for generating predictive models as recited in claim 1, wherein to provide a plurality of user interfaces, the at least one computing device operates to:
provide a particular user interface to enable the user to provide one or more inputs regarding the select of one of the strong learning models as the first predictive model.

11. The computing apparatus for generating predictive models as recited in claim 1, wherein the user interface configured for the user to change a characteristic of an attribute from being characterized as a logistic selected attribute to being characterized as a demographic selected attribute.

\* \* \* \* \*